US006676824B2

(12) United States Patent
Urquhart et al.

(10) Patent No.: US 6,676,824 B2
(45) Date of Patent: Jan. 13, 2004

(54) PROCESS FOR PURIFICATION OF MOLTEN SALT ELECTROLYTES

(75) Inventors: Roger C. Urquhart, Pointe Claire (CA); Roman Deshko, Toronto (CA); Sami Mourad, Dollard des Ormeaux (CA)

(73) Assignee: Hatch Associates Ltd., Ontario (CA)

( * ) Notice: Subject to any disclaimer, the term of this patent is extended or adjusted under 35 U.S.C. 154(b) by 0 days.

(21) Appl. No.: 09/906,663

(22) Filed: Jul. 18, 2001

(65) Prior Publication Data

US 2003/0015434 A1 Jan. 23, 2003

(51) Int. Cl.[7] .............................. C25C 3/04; C25C 7/08; C25C 1/00
(52) U.S. Cl. ................. 205/404; 205/351; 205/560
(58) Field of Search ................. 205/351, 404, 205/477, 560

(56) References Cited

U.S. PATENT DOCUMENTS

| | | | |
|---|---|---|---|
| 1,820,022 A | 8/1931 | Hunter | 205/405 |
| 2,375,009 A | 5/1945 | Lepsoe et al. | 205/404 |
| 3,404,036 A | 10/1968 | Kummer et al. | 429/17 |
| 3,448,271 A | 1/1970 | Kummer et al. | 204/180 |
| 3,488,223 A | 1/1970 | Kummer et al. | 204/70 |
| 3,562,134 A | 2/1971 | Love | 204/239 |
| 3,997,413 A | 12/1976 | Fougner | 204/70 |
| 4,076,602 A | 2/1978 | Wheeler | 204/70 |
| 4,510,029 A | 4/1985 | Neelameggham et al. | 204/130 |
| 5,089,094 A * | 2/1992 | Ogasawara et al. | 205/405 |

* cited by examiner

Primary Examiner—Patrick Ryan
Assistant Examiner—Thomas H. Parsons
(74) Attorney, Agent, or Firm—Martin Fleit; Paul D. Bianco; Fleit Kain Gibbons Gutman Bongini & Bianco P.L.

(57) ABSTRACT

A process for purification of molten salt electrolytes containing magnesium chloride in which oxygen-containing impurities such as magnesium hydroxychloride are destroyed both electrolytically and chemically. The process comprises passing a direct current through a magnesium chloride-containing molten salt electrolyte, thereby electrolyzing a portion of the oxygen-containing impurities at the anode. In addition, the voltage and current of the direct current are sufficiently high to cause electrolysis of a small proportion of the magnesium chloride present in the electrolyte to thereby produce finely dispersed droplets of elemental magnesium in the electrolyte. The droplets of elemental magnesium react chemically with oxygen-containing impurities present in the electrolyte. The purified electrolyte is transferred to an electrolytic cell for the production of magnesium metal and chlorine gas.

16 Claims, No Drawings

PROCESS FOR PURIFICATION OF MOLTEN SALT ELECTROLYTES

FIELD OF THE INVENTION

The present invention relates to processes for purification of molten salt electrolytes by passing a direct current between an anode and a cathode immersed in the electrolyte. Preferably, the electrolytes to be purified according to the invention are those containing magnesium chloride which are intended for use in the production of magnesium metal and chlorine gas.

BACKGROUND OF THE INVENTION

Magnesium metal is usually obtained by electrolysis of molten magnesium chloride ($MgCl_2$). The electrolysis reaction is carried out in one or more electrolysis cells, into which a molten salt electrolyte comprising magnesium chloride and one or more carrier salts is charged. In addition to magnesium metal, the electrolysis reaction also produces an off-gas of which the major component is chlorine ($Cl_2$).

In order to optimize energy efficiency and recovery of magnesium metal from the electrolysis process, it is desired that the magnesium chloride fed to the electrolysis cells be substantially free of water and other oxygen-containing impurities. The presence of such materials in the molten salt electrolyte will result in diminished current efficiency, increased power consumption per tonne of magnesium produced, an increase in the rate of consumption of carbon electrodes used in the electrolysis cell, and reduced metal recovery due to increased sludge formation.

Water primarily enters the molten salt electrolyte during charging of magnesium chloride, which is not completely anhydrous. Any water which is not immediately removed from the molten salt electrolyte reacts with magnesium chloride to form magnesium oxide (MgO) and hydrogen chloride gas (HCl), which combine to form the soluble complex of magnesium hydroxychloride (MgOHCl). The presence of magnesium oxide and magnesium hydroxychloride in the molten salt electrolyte will have a detrimental effect on the subsequent electrolysis process and therefore it is desired that these compounds be removed as completely as possible. In presently used processes, water contained in the magnesium chloride feed is removed either by chlorine gas with addition of a reducing agent or by sparging hydrogen chloride acid gas into the molten electrolyte in order to ensure that the reaction equilibrium that results in the creation of magnesium oxide and magnesium hydroxychloride will be driven towards the destruction of these compounds.

Although the use of chlorine-based gases for the above purpose is somewhat effective, the complete destruction of magnesium oxide and magnesium hydroxychloride would require a large excess of the gas, and is therefore not practical. Therefore, even after this purification step, an amount of magnesium hydroxychloride typically remains in the molten salt electrolyte which will have a detrimental impact upon the operation of the electrolysis cell. Specifically, the presence of this compound will result in increased formation of sludge, the chief component of which is magnesium oxide, and generation of hydrogen gas in the electrolysis cell.

A number of processes for destruction of oxygen-containing impurities such as magnesium hydroxychloride are known in the prior art. Some of these are now discussed below.

U.S. Pat. Nos. 3,418,223 and 3,562,134 to Love relate to a continuous process for producing high purity magnesium and chlorine gas by electrolysis of anhydrous magnesium chloride salt. The process disclosed by Love starts by feeding solid blocks of substantially anhydrous magnesium chloride into a melt cell. A gas containing hydrogen chloride is fed into the melt cell through a pipeline to remove some of the surface moisture from the magnesium chloride. The melt cell contains two sets of electrodes: a first set of electrodes energized by an alternating current source and a second set of electrodes energized by a low voltage, direct current source of up to about 2 volts, the second set of electrodes being comprised of carbon. According to Love, the first set of electrodes melts the magnesium chloride blocks and the second set of electrodes decomposes oxygen-bearing compounds in the salt and converts the decomposed oxide to carbon monoxide gas which is evolved from the melt cell. Following purification, the magnesium chloride is transferred from the melt cell to a charging cell, from which it is transferred to the electrolysis cells.

U.S. Pat. No. 4,510,029 to Neelameggham et al. discloses a process for electrolytic purification of magnesium chloride in which direct current electrolysis is used to reduce impurities to low levels. Iron is mentioned as the primary impurity of interest in the Neelameggham patent. The purification process takes place in a steel tank having a refractory lining and provided with a main anode and a main cathode, between which are provided a number of bipolar electrodes having apertures provided therein for passage of electrolyte. Iron sludge is deposited on the cathodic faces of the bipolar electrodes, which are periodically removed for cleaning.

U.S. Pat. No. 2,375,009 to Lepsoe discloses a process for purification of molten magnesium chloride, which takes place in a purification furnace. Metallic magnesium carried by sludge removed in a settling furnace is transferred to the purification furnace. Lepsoe discloses that the metallic magnesium is effective in replacing metallic chloride impurities contained in the molten magnesium chloride.

U.S. Pat. No. 3,997,413 to Fougner is similar to Lepsoe in that the magnesium chloride is contacted with magnesium metal to remove impurities. However, in Fougner, the magnesium used for purification is in the form of a vapor which condenses on the molten salt. The condensed magnesium is intimately mixed with the magnesium chloride under conditions of vigorous agitation. According to Fougner, the purpose of the vaporized magnesium is to displace metal chloride impurities. Also mentioned is the use of hot molten cell bath material for admixture with the molten magnesium chloride in order to dry the magnesium chloride and reduce the amount of magnesium hydroxychloride produced by reaction of magnesium chloride with water.

U.S. Pat. No. 4,076,602 to Wheeler discloses a method for removing hydrogen and oxygen-containing impurities from magnesium chloride by feeding powdered, spray dried magnesium chloride to the electrolysis cell. Although the spray dried magnesium chloride contains water, magnesium hydroxychloride and magnesium oxide, Wheeler discloses that the powder melts instantaneously when it contacts the magnesium chloride and a substantial portion of the hydrogen-containing impurities are flash vaporized. The magnesium oxide and remaining water are kept in suspension by a high electrolyte circulation rate and are chlorinated by the cell chlorine produced at the anode.

In practice, it has been found that many methods for purification of magnesium chloride-containing electrolytes are either ineffective or impractical, and therefore the need remains for an effective method for purification of such molten salt electrolytes.

SUMMARY OF THE INVENTION

The present invention at least partially overcomes the disadvantages of the prior art by providing a process for purification of molten salt electrolytes in which oxygen-containing impurities are destroyed both electrolytically and chemically.

According to the process of the invention, a direct current is passed through a magnesium chloride-containing molten salt electrolyte. As in the Love process, the direct current results in destruction of hydroxychloride ions at the anode, thereby electrolyzing some of the magnesium hydroxychloride present in the electrolyte.

However, in contrast to the Love process, the direct current voltage and amperage in the process of the present invention are sufficient to cause electrolysis of a small proportion of the magnesium chloride present in the electrolyte to thereby produce finely dispersed magnesium droplets in the electrolyte. These droplets of magnesium metal react chemically with the magnesium hydroxychloride present in the electrolyte to produce magnesium chloride and an amount of magnesium oxide which is removed by settling from the electrolyte melt prior to the electrolysis reaction.

DETAILED DESCRIPTION OF PREFERRED EMBODIMENTS

The first preferred embodiment of the present invention comprises a process for purification of a molten salt electrolyte containing magnesium chloride, the purification process being performed prior to use of the molten salt electrolyte in an electrolysis cell for production of elemental magnesium.

Preferably, a molten salt electrolyte for use in the production of elemental magnesium comprises from about 15 to 45% by weight magnesium chloride, with the balance comprising one or more carrier salts, for example potassium chloride, sodium chloride and calcium chloride. The carrier salts are not electrolyzed during the electrolysis of magnesium chloride and are typically recycled after the electrolysis reaction, during which the molten salt electrolyte becomes depleted of magnesium chloride.

In a typical process for preparing a molten salt electrolyte, solid magnesium chloride-containing feed material is fed into a salt melt which preferably comprises depleted electrolyte from an electrolysis cell, and which contains one or more carrier salts and some amount of magnesium chloride. Sufficient solid magnesium chloride-containing feed is added to the salt melt to bring the magnesium chloride content to about 15 to 45% by weight.

Throughout this application, the term "salt melt" refers to a mixture of molten carrier salts, preferably a depleted electrolyte obtained from an electrolysis cell in which magnesium chloride is converted to elemental magnesium. Accordingly, the salt melt typically contains some amount of magnesium chloride.

Throughout this application, the term "molten salt electrolyte" refers to a salt melt in which the content of magnesium chloride is sufficient for the production of elemental magnesium in an electrolysis cell, preferably in the range of from about 15 to 45% by weight.

It is during the addition of solid magnesium chloride-containing feed that water is typically introduced into the molten salt electrolyte. Some of the water entering the electrolyte is introduced by the magnesium chloride itself, which is typically in the form of a hydrate. Water may also be introduced by exposure of the molten salt electrolyte to atmospheric moisture.

At the temperatures employed during addition of the magnesium chloride, typically above 500° C., much of the water contained in the magnesium chloride hydrate is flash vaporized and removed from the molten salt electrolyte in the off-gas. However, at the temperatures employed in the production of the electrolyte, some of the water reacts with magnesium chloride before it can be driven off. The following chemical equation represents the chemical reaction between magnesium chloride and water:

$$MgCl_2 + H_2O \rightleftharpoons MgO + 2HCl$$

In the reaction depicted above, it is important to note that the reactants on the left side of the equation are in equilibrium with the products on the right side of the equation. The equilibrium can be driven in either direction by varying the relative amounts of the reactants and the products.

At the temperatures involved, magnesium oxide is a solid which has greater density than the molten salt electrolyte. Accordingly, magnesium oxide settles out from the electrolyte as sludge which is easily separated therefrom. However, a portion of the water present in the magnesium chloride-containing feed reacts with magnesium chloride according to the following reaction:

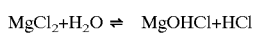
$$MgCl_2 + H_2O \rightleftharpoons MgOHCl + HCl$$

The magnesium hydroxychloride formed according to the above reaction is soluble in the electrolyte and is therefore a particularly undesirable impurity. The presence of magnesium hydroxychloride in the electrolyte has a detrimental impact on the operation of the electrolysis cell, resulting in abnormal operation of the cell due to increased sludge formation and generation of hydrogen gas in the electrolysis cell. The presence of magnesium hydroxychloride in the electrolyte also results in increased power consumption per tonne of magnesium produced, as well as an increase in the rate of consumption of carbon electrodes used in the electrolysis cell.

In order to drive the above equilibrium reactions towards destruction of magnesium oxide and magnesium hydroxychloride, substantially anhydrous hydrogen chloride or chlorine gas is added to the molten salt electrolyte. The addition of chlorine-containing gases results in conversion of a portion of the magnesium oxide and magnesium hydroxychloride to magnesium chloride and water, which is removed in the off-gas.

The use of this purification method alone, particularly with hydrogen chloride gas, requires an excess of gas to be used in the production of the electrolytic cell feed and thus may not be practical. In the method of the present invention, it is preferred to use chlorine-containing gases to remove the bulk of the moisture from the feed, and to utilize the electrochemical purification of the present invention, as more completely described below, to further purify the cell feed.

In the preferred process of the present invention, the electrolyte is purified by passing therethrough a direct current between an anode and a cathode, both of which are preferably comprised of carbon.

As known in the prior art, the direct current will destroy oxygen-containing impurities such as magnesium hydroxychloride at the anode, producing an off-gas containing chlorine, hydrogen chloride and oxygen, with the oxygen typically reacting with the carbon electrodes to produce carbon monoxide and carbon dioxide.

However, in the purification processes utilized in the prior art, the voltage of the direct current is low enough, typically about 2 volts, so as not to bring about electrolysis of magnesium chloride in the electrolyte.

The inventors of the present invention have appreciated that it is desirable to also use magnesium metal to chemically destroy oxygen-containing impurities such as magnesium hydroxychloride by the following reaction:

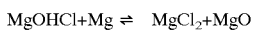

The magnesium oxide produced in the above reaction is precipitated as sludge which is preferably separated from the electrolyte prior to transfer to the electrolysis cell.

The use of magnesium metal to chemically destroy magnesium hydroxychloride is known in the prior art discussed above, i.e. the Lepsoe, Fougner and Wheeler patents. However, no prior art processes generate magnesium directly from the electrolyte using a low voltage direct current which is also used to electrolyze magnesium hydroxychloride.

In the process of the present invention, the voltage and amperage of the direct current are preferably high enough to cause formation of elemental magnesium in the electrolyte, but low enough not to cause significant electrolysis of the magnesium chloride present in the electrolyte so as to have a negative impact on the yield of magnesium metal recovered from the electrolysis cell.

The inventors have found that the amperage of the direct current required in the process of the present invention is determined according to the magnesium hydroxychloride content of the melt and the cell throughput. In general, the amperage of the direct current is minimized so that the amount of elemental magnesium generated will be sufficient to react with the magnesium hydroxychloride in the electrolyte without adversely impacting the recovery of magnesium metal from the electrolysis cell. Therefore, the amperage of the direct current is low compared with that required for the electrolysis cell, typically no greater than about 10% of the amperage required for the electrolysis cell operation.

The voltage of the direct current utilized in the method of the invention is equal to or greater than the decomposition voltage of magnesium chloride in the melt. In a particularly preferred embodiment of the present invention, the voltage drop between the anode and the cathode immersed in the molten salt electrolyte is greater than about 2.75V, and is preferably no greater than about 5V.

In a second preferred embodiment of the present invention, the above-described process for purifying a molten salt electrolyte is incorporated into a process for preparation and purification of a molten salt electrolyte. According to the second preferred embodiment, a salt melt is provided containing one or more carrier salts, the salt melt having the composition described above and preferably comprising depleted electrolyte recycled from an electrolysis cell. To this salt melt is added solid magnesium chloride-containing feed which melts and combines with the salt melt to form a molten salt electrolyte having a composition as described above.

During addition of the solid magnesium chloride-containing feed, anhydrous gaseous hydrogen chloride or chlorine gas with a reducing agent is preferably added to the molten salt electrolyte in an amount sufficient to substantially completely drive off water from the electrolyte. Following this dehydration step, the electrolyte is purified as described above by passing a direct current through the electrolyte between an anode and a cathode. As illustrated in the chemical reaction above, one of the products of the purification process is magnesium oxide, which is allowed to settle from the electrolyte as sludge, which is separated from the electrolyte prior to transfer to the electrolysis cell.

In a third preferred embodiment of the invention, the above-described process for preparing and purifying a molten salt electrolyte is incorporated into a process for preparing elemental magnesium. In the process for preparing elemental magnesium, the molten salt electrolyte is prepared and purified as described. The electrolyte is then transferred to an electrolysis cell where it is electrolyzed to convert magnesium chloride to elemental magnesium and chlorine gas.

In a preferred process for preparing elemental magnesium, the depleted molten salt electrolyte is removed from the electrolysis cell and is recycled for preparation of fresh electrolyte containing magnesium chloride.

Although the invention has been described in relation to certain preferred embodiments, it is not intended to be limited thereto. Rather, the invention includes all embodiments which may fall within the scope of the following claims.

What is claimed is:

1. A process for purification of a molten salt electrolyte containing magnesium chloride prior to use of the electrolyte in an electrolysis cell for production of elemental magnesium, said process comprising:

passing a direct current through said molten salt electrolyte between an anode and a cathode, said direct current being of greater than about 2.75 V, as measured between the anode and the cathode and of sufficient amperage to destroy a first portion of oxygen-containing impurities at the anode and to produce an amount of elemental magnesium in said electrolyte sufficient to react with and destroy a second portion of said oxygen-containing impurities.

2. The process of claim 1, wherein said oxygen-containing impurities comprise magnesium oxide and magnesium hydroxychloride.

3. The process of claim 1, wherein said amperage of the direct current is not greater than about 10 percent of an amperage required for operation of said electrolysis cell.

4. The process of claim 1, additionally comprising the step of separating sludge from the electrolyte, said step of separating sludge being performed prior to transfer of the electrolyte to the electrolysis cell.

5. A process for preparing and purifying a molten salt electrolyte containing magnesium chloride prior to use of the electrolyte in an electrolytic cell for production of elemental magnesium, said process comprising:

(a) providing a salt melt containing one or more carrier salts;

(b) adding solid magnesium chloride to said salt melt, thereby melting said solid magnesium chloride and forming said molten salt electrolyte;

(c) adding a chlorine-containing gas to said molten salt electrolyte in an amount sufficient to substantially completely drive off water from said molten salt electrolyte;

(d) passing a direct current through said molten salt electrolyte between an anode and a cathode, said direct current being of greater than about 2.75 V, as measured between the anode and the cathode and of sufficient amperage to destroy a first portion of oxygen-containing impurities at the anode and to produce an amount of elemental magnesium in said electrolyte sufficient to react with and destroy a second portion of said oxygen-containing impurities; and (e) separating sludge from said electrolyte.

6. The process of claim 5, wherein said solid magnesium chloride is a hydrate.

7. The process of claim 5 wherein, after adding the solid magnesium chloride to the salt melt in step (a), contact between the molten salt electrolyte and the ambient atmosphere is avoided.

8. The process of claim 5, wherein said chlorine-containing gas is anhydrous.

9. The process of claim 5, wherein the salt melt and the molten salt electrolyte are maintained at a temperature of greater than about 500° C.

10. The process of claim 5, wherein said salt melt containing one or more carrier salts comprises depleted electrolyte obtained from said electrolysis cell.

11. The process of claim 5, wherein said oxygen-containing impurities comprise magnesium oxide and magnesium hydroxychloride.

12. The process of claim 5, wherein said amperage of the direct current is not greater than about 10 percent of an amperage required for operation of said electrolysis cell.

13. A process for preparing elemental magnesium from a molten salt electrolyte containing magnesium chloride, said process comprising:

(a) providing a salt melt containing one or more carrier salts;

(b) adding solid magnesium chloride to said salt melt, thereby melting said solid magnesium chloride and forming said molten salt electrolyte;

(c) adding a chlorine-containing gas to said molten salt electrolyte in an amount sufficient to substantially completely drive off water from said molten salt electrolyte;

(d) passing a direct current through said molten salt electrolyte between an anode and a cathode, said direct current being of sufficient voltage and amperage to destroy a first portion of oxygen-containing impurities at the anode and to produce an amount of elemental magnesium in said electrolyte sufficient to react with and destroy a second portion of said oxygen-containing impurities; and (e) separating sludge from said molten salt electrolyte, (f) transferring said molten salt electrolyte to an electrolysis cell; and (g) electrolyzing said molten salt electrolyte in said electrolysis cell to convert magnesium chloride to elemental magnesium and chlorine gas.

14. The process of claim 13, wherein said amperage of the direct current is not greater than about 10 percent of an amperage required for operation of said electrolysis cell.

15. The process of claim 13, wherein said voltage of the direct current is equal to or greater than a decomposition voltage of magnesium chloride in the molten salt electrolyte.

16. The process of claim 13, wherein said voltage of the direct current is greater than about 2.75 V, as measured between the anode and the cathode.

* * * * *

UNITED STATES PATENT AND TRADEMARK OFFICE
CERTIFICATE OF CORRECTION

PATENT NO. : 6,676,824 B2
DATED : January 13, 2004
INVENTOR(S) : Robert C. Urquhart, Roman Deshko and Sami Mourad It is certified that error appears in the above-identified patent and that said Letters Patent is hereby corrected as shown below:

Title page,
Item [73], Assignee, delete "Hatch Associates Ltd." and insert -- Noranda Inc. --

Signed and Sealed this

Nineteenth Day of October, 2004

JON W. DUDAS
*Director of the United States Patent and Trademark Office*